(12) United States Patent
Rau et al.

(10) Patent No.: US 6,921,746 B2
(45) Date of Patent: Jul. 26, 2005

(54) MULTIFUNCTIONAL POLYMERS, METHOD FOR THE PRODUCTION AND USE THEREOF

(75) Inventors: Iris Rau, Buerstadt (DE); Johannes Perner, Neustadt (DE); Christian Ott, Speyer (DE); Richard Baur, Mutterstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 305 days.

(21) Appl. No.: 10/239,879

(22) PCT Filed: Apr. 10, 2001

(86) PCT No.: PCT/EP01/04082

§ 371 (c)(1),
(2), (4) Date: Oct. 4, 2002

(87) PCT Pub. No.: WO01/77195

PCT Pub. Date: Oct. 18, 2001

(65) Prior Publication Data

US 2003/0236178 A1 Dec. 25, 2003

(30) Foreign Application Priority Data

Apr. 12, 2000 (DE) .......................................... 100 18 192

(51) Int. Cl.$^7$ .......................... C11D 3/37; C08F 218/04; C08F 220/04
(52) U.S. Cl. ........................... 510/476; 510/477; 560/1; 560/190; 526/292.1; 526/307.1; 526/317.1; 526/318.4; 526/319; 526/341
(58) Field of Search ................................. 510/476, 477; 560/1, 190; 526/292.1, 307.1, 317.1, 318.4, 319, 341

(56) References Cited

U.S. PATENT DOCUMENTS 2,611,765 A 9/1952 Dickey
2,728,746 A 12/1955 Unruh
4,031,022 A * 6/1977 Vogt et al. .................. 510/476

FOREIGN PATENT DOCUMENTS

| DE | 24 31 823 | 2/1975 |
|---|---|---|
| DE | 31 39 091 | 5/1982 |
| EP | 0 381 261 | 8/1990 |
| EP | 0 508 934 | 10/1992 |
| EP | 0 814 193 | 12/1997 |

* cited by examiner

*Primary Examiner*—Brian P. Mruk
(74) *Attorney, Agent, or Firm*—Oblon, Spivak, McClelland, Maier & Neustadt, P.C.

(57) ABSTRACT

Multifunctional polymers containing polymerized units of
(a) α-Acyloxyacrylonitrile, α-haloacrylic acid, α-acyloxyacrylic ester and/or α-hydroxyacrylic acid,
(b) monoethylenically unsaturated carboxylic acids,
(c) vinyl esters of saturated aliphatic monocarboxylic acids and/or vinyl alcohol and optionally
(d) other monoethylenically unsaturated monomers copolymerizable with said monomers (a) to (c) and optionally
(e) crosslinkers containing at least two ethylenically unsaturated double bonds and having a K value of at least 7 (determined after H. Fikentscher in acetone at 25° C. and a polymer concentration of 1% by weight), processes for preparing multifunctional polymers by copolymerizing monomer mixtures of (a) α-acyloxyacrylonitrile, α-haloacrylic acid and/or α-acyloxyacrylic ester,
(b) monoethylenically unsaturated carboxylic acids,
(c) vinyl esters of saturated aliphatic monocarboxylic acids and optionally
(d) other monoethylenically unsaturated monomers copolymerizable with said monomers (a) to (c) and optionally
(e) crosslinkers containing at least two ethylenically unsaturated double bonds in the presence of polymerization initiators that form free radicals and partially or completely hydrolyzing the polymerized monomer units (a) and (c) in the copolymers thus obtainable and use of the multifunctional polymers in laundry detergents and cleaners, to bind polyvalent metal ions, as a stabilizer in textile bleaching and the bleaching of pulp for papermaking.

20 Claims, No Drawings

MULTIFUNCTIONAL POLYMERS, METHOD FOR THE PRODUCTION AND USE THEREOF

BACKGROUND OF THE INVENTION

1. Field of the Invention

This invention relates to multifunctional polymers containing polymerized units of (a) α-acyloxyacrylonitrile, α-haloacrylic acid, α-acyloxyacrylic ester and/or α-hydroxyacrylic acid,
(b) monoethylenically unsaturated carboxylic acids,
(c) vinyl esters of saturated aliphatic monocarboxylic acids and/or vinyl alcohol and optionally
(d) other monoethylenically unsaturated monomers copolymerizable with said monomers (a) to (c) and optionally
(e) crosslinkers containing at least two ethylenically unsaturated double bonds.

2. Description of the Background

U.S. Pat. No. 2,728,746 discloses polymers of α-hydroxyacrylic acid which are prepared by polymerizing α-acyloxyacrylates optionally together with other monomers such as ethylene, styrene, acrylic acid or methacrylic acid and subsequent hydrolysis of the polymerized α-acyloxyacrylate units with bases. DE-A-24 31 823 discloses a process for preparing water-soluble salts of poly-α-hydroxyacrylic acid by converting α,β-dichloropropionic acid by thermal hydrogen chloride elimination into α-chloroacrylic acid, then polymerizing the α-chloroacrylic acid in aqueous solution and treating the polymer with an aqueous solution of an alkali metal hydroxide or ammonia. The water-soluble salts of the thus obtainable poly-α-hydroxyacrylic acid are used for example as sequestrants for metal ions and as builders in detergents and cleaners.

EP-A-381 261 discloses nonaqueous liquid detergents which include a nonionic surfactant and a dispersed particulate phase which includes a carbonate, a mixture of carbonate and bicarbonate builder and a carboxyl-containing polymer, for example a copolymer of maleic acid and acrylic acid. According to the description part, useful carboxyl-containing polymers include poly-α-hydroxyacrylic acid. The liquid laundry detergent may also include bleach.

DE-A-31 39 091 discloses phosphate-free or low-phosphate laundry detergents and cleaners which include a polycarboxylic acid in salt form, an alkali metal heptoate or alkali metal gluconate, an alkali metal silicate and an alkali metal hydroxide. Polycarboxylic acids contemplated are in particular the polymers of acrylic acid, α-hydroxyacrylic acid, maleic acid, itaconic acid, mesaconic acid, arconitic acid, methylenemalonic acid and citraconic acid. Similarly the copolymers of the carboxylic acids mentioned with each other or with ethylenically unsaturated compounds such as ethylene, propylene, vinyl ether, vinyl acetate, furan, acrolein, acrylamide, acrylonitrile, methacrylic acid or crotonic acid are suitable polycarboxylic acids. EP-A-508 934 likewise discloses laundry detergent mixtures which include polymers of hydroxyacrylic acid as builders.

EP-A-814 193 discloses a bleach stabilizer for peroxides which includes homo- or copolymers of α-hydroxyacrylic acid or water-soluble salts thereof, homo- or copolymers of acrylic acid, methacrylic acid and maleic acid and, as a further component, diethylenetriaminepentaacetic acid, diethylenetetraminehexaacetic acid or water-soluble salts thereof. The three components have a synergistic effect when used as a bleach stabilizer for peroxides.

SUMMARY OF THE INVENTION

It is an object of the present invention to provide novel substances which have an improved effect compared to existing polymers based on α-hydroxycarboxylic acid.

We have found that this object is achieved by multifunctional polymers containing polymerized units of (a) α-acyloxyacrylonitrile, α-haloacrylic acid, α-acyloxyacrylic ester and/or α-hydroxyacrylic acid,
(b) monoethylenically unsaturated carboxylic acids,
(c) vinyl esters of saturated aliphatic monocarboxylic acids and/or vinyl alcohol and optionally
(d) other monoethylenically unsaturated monomers copolymerizable with said monomers (a) to (c) and optionally
(e) crosslinkers containing at least two ethylenically unsaturated double bonds and having a K value of at least 7 (determined after H. Fikentscher in acetone at 25° C. and a polymer concentration of 1% by weight).

The invention also contemplates a process for preparing multifunctional polymers, which comprises copolymerizing monomer mixtures of (a) α-acyloxyacrylonitrile, α-haloacrylic acid and/or α-acyloxyacrylic ester,
(b) monoethylenically unsaturated carboxylic acids,
(c) vinyl esters of saturated aliphatic monocarboxylic acids and optionally
(d) other monoethylenically unsaturated monomers copolymerizable with said monomers (a) to (c) and optionally
(e) crosslinkers containing at least two ethylenically unsaturated double bonds in the presence of polymerization initiators that form free radicals and partially or completely hydrolyzing the polymerized monomer units (a) and (c) in the copolymers thus obtainable.

DETAILED DESCRIPTION OF THE PREFERRED EMBODIMENTS

Preferably monomer mixtures of (a) from 2 to 98 mol % of α-acyloxyacrylonitrile, α-haloacrylic acid and/or α-acyloxyacrylic ester,
(b) from 1 to 95 mol % of monoethylenically unsaturated carboxylic acids,
(c) from 1 to 90 mol % of vinyl esters of saturated aliphatic monocarboxylic acids and optionally
(d) from 0 to 20 mol % of other monoethylenically unsaturated monomers copolymerizable with said monomers (a) to (c) and
(e) from 0 to 10 mol % of crosslinkers containing at least two ethylenically unsaturated double bonds, the percentages (a) to (e) always adding up to 100, are copolymerized and the units (a) and (c) in the copolymers thus obtainable are partially or completely hydrolyzed.

α-Acyloxyacrylonitrile and α-acyloxyacrylic esters can be characterized for example by means of the following formula:

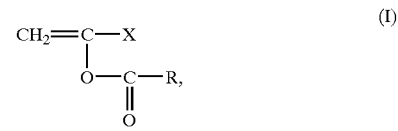

(I)

where X=—CN or

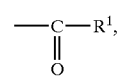

R=H, $C_1$–$C_6$-alkyl, aryl and
$R^1$=OH, $C_1$–$C_6$-alkoxy, $C_1$–$C_6$-alkyl, aryl and $C_5$–$C_8$-cycloalkyl.

Examples of α-acyloxyacrylonitriles are α-acetoxyacrylonitrile, α-propionyloxyacrylonitrile and α-butyryloxyacrylonitrile.

α-Acyloxyacrylic esters of the formula I where X=CO—$R^1$ and R=$C_1$–$C_6$-alkyl are for example methyl α-acetoxyacrylate (R=$CH_3$, $R^1$=$OCH_3$), ethyl α-acetoxyacrylate (R=$CH_3$, $R^1$=$OC_2H_5$), n-propyl α-acetoxyacrylate (R=$CH_3$, $R^1$=$OCH_2CH_2CH_3$), isopropyl α-acetoxyacrylate (R=$CH_3$, $R^1$=$OCH(CH_3)_2$), n-butyl α-acetoxyacrylate ((R=$CH_3$, $R^1$=$O(CH_2)_3CH_3$), isobutyl α-acetoxyacrylate, isodecyl α-acetoxyacrylate, methyl α-propionyloxyacrylate (R=$C_2H_5$, $R^1$=$OCH_3$), ethyl α-propionyloxyacrylate (R=$C_2H_5$, $R^1$=$OC_2H_5$), methyl α-butyryloxyacrylate (R=$C_3H_7$, $R^1$=$OCH_3$) and ethyl α-butoxyacrylate.

The term α-acyloxyacrylic ester shall also comprehend such compounds as, after polymerization and hydrolysis, give rise to polymers containing α-hydroxyacrylic acid units. These include for example cyclic acyloxyacrylates of the formulae

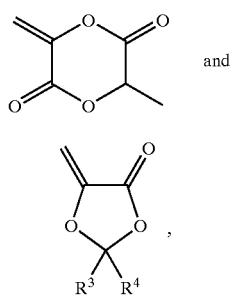

where $R^3$ and $R^4$ are identical or different and each is H, $CH_3$, Et, Pr, i-Pr, n-Bu, i-Bu, aryl or substituted aryl.

The compound of the formula II is a cyclic acyloxyacrylate (3,6-bis(methylene)-1,4-dioxan-2,5-dione) and the compounds of the formula III are cyclic acetals of the 5-methylene-1,3-dioxolan-4-one type whose acetal component is derived for example from an aldehyde such as formaldehyde, acetaldehyde, propionaldehyde, isobutyraldehyde or benzaldehyde or from a ketone such as acetone, methyl ethyl ketone or cyclohexanone ($R^3$, $R^4$=alkyl, aralkyl).

Examples of useful α-haloacrylic acids are α-chloroacrylic acid and α-bromoacrylic acid.

The multifunctional polymers contain as component (b) polymerized units of monoethylenically unsaturated carboxylic acids, for example acrylic acid, methacrylic acid, maleic acid, maleic anhydride, itaconic acid, fumaric acid, mesaconic acid, aconitic acid, methylenemalonic acid and citraconic acid. Among this group of monomers preference is given to using acrylic acid, methacrylic acid, maleic acid and maleic anhydride.

As component (c) the multifunctional polymers contain vinyl esters of saturated aliphatic monocarboxylic acids in polymerized form. The vinyl esters are derived for example from monobasic saturated carboxylic acids having 2–18 carbon atoms. Examples thereof are vinyl acetate, vinyl propionate, vinyl butyrate, vinyl isobutyrate, vinyl palmitate, vinyl stearate and vinyl laurate. The copolymerization can be carried out using for example a single vinyl ester or else a mixture of two different vinyl esters, for example mixtures of vinyl acetate and vinyl propionate or mixtures of vinyl acetate and vinyl butyrate. Among this group of monomers preference is given to using vinyl acetate.

Other monoethylenically unsaturated monomers copolymerizable with the monomers (a) to (c) are for example acrylonitrile, methacrylonitrile, acrylamide, methacrylamide, acrolein, ethylene, isobutylene, propylene, diisobutene, styrene, acrylamido-2-methyl-propanesulfonic acid, vinylsulfonic acid, allylsulfonic acid, methallylsulfonic acid, vinylphosphonic acid, allylphosphonic acid, dimethylaminoethyl acrylate, diethylaminoethyl acrylate, diethylaminoethyl methacrylate, N-vinylpyrrolidone, N-vinylformamide, N-vinylimidazole, N-vinylimidazoline, 1-vinyl-2-methylimidazole, 1-vinyl-2-methylimidazoline and hydroxyalkyl esters having 2–6 carbon atoms in the hydroxyalkyl group of monoethylenically unsaturated carboxylic acids containing 3–6 carbon atoms such as hydroxyethyl acrylate, hydroxyethyl methacrylate, hydroxy-n-propyl acrylate, hydroxyisopropyl acrylate and hydroxyisobutyl acrylate. The monomers which contain free acid groups, for example vinyl sulfonate, can also be used in the form of the alkali metal and ammonium salts in the copolymerization.

Monomers of group (e) which contain at least two ethylenically unsaturated double bonds are customarily referred to as crosslinkers. Suitable crosslinkers are for example diacrylates or dimethacrylates of at least dihydric saturated alcohols, for example ethylene glycol diacrylate, ethylene glycol dimethacrylate, 1,2-propylene glycol diacrylate, 1,2-propylene glycol dimethacrylate, 1,4-butanediol diacrylate, 1,4-butanediol dimethacrylate, hexanediol diacrylate, hexanediol dimethacrylate, neopentylglycol diacrylate, neopentylglycol dimethacrylate, 3-methylpentanediol diacrylate and 3-methylpentanediol dimethacrylate. Similarly, the acrylic and methacrylic esters of alcohols having more than 2 OH groups can be used as crosslinkers, for example trimethylolpropane triacrylate or trimethylolpropane trimethacrylate. A further class of crosslinkers are diacrylates or dimethacrylates of polyethylene glycols or polypropylene glycols each having molecular weights of from 200 to 9000. Polyethylene glycols and polypropylene glycols used for the preparation of the diacrylates or dimethacrylates preferably have a molecular weight of from 400 to 2000 in each case. As well as the homopolymers of ethylene oxide or propylene oxide it is also possible to use block copolymers of ethylene oxide and propylene oxide or random copolymers of ethylene oxide and propylene oxide. Similarly, the oligomers of ethylene oxide and propylene oxide are suitable for preparing crosslinkers, for example diethylene glycol diacrylate, diethylene glycol dimethacrylate, triethylene glycol diacrylate, triethylene glycol dimethacrylate, tetraethylene glycol diacrylate and/or tetraethylene glycol dimethacrylate.

Useful crosslinkers further include vinyl esters of ethylenically unsaturated $C_3$–$C_6$-carboxylic acids, for example vinyl acrylate, vinyl methacrylate or vinyl itaconate. Useful crosslinkers further include vinyl esters of saturated carboxylic acids containing at least 2 carboxyl groups and also di- and polyvinyl ethers of at least dihydric alcohols, for example divinyl adipate, butanediol divinyl ether, trimethylolpropane trivinyl ether. Further crosslinkers are allyl esters of ethylenically unsaturated carboxylic acids, for example allyl acrylate and allyl methacrylate, allyl ethers of polyhydric alcohols, for example pentaerithritol triallyl ether, triallylsucrose and pentaallylsucrose. Useful crosslinkers further include methylenebismethacrylamide, divinylethyleneurea, divinylpropyleneurea, divinylbenzene, divinyldioxane, tetraallylsilane and tetravinylsilane.

The multifunctional polymers preferably contain copolymerized units (a) of α-hydroxyacrylic acid and units (c) of partially or completely hydrolyzed vinyl esters of saturated monocarboxylic acids and have a K value of at least 6 (determined after H. Fikentscher in water at 25° C. and a polymer concentration of 1% by weight). The multifunctional polymers contain for example polymerized units of (a) from 2 to 98 mol % of α-acyloxyacrylonitrile, α-haloacrylic acid, α-acyloxyacrylic ester and/or α-hydroxyacrylic acid, (b) from 1 to 95 mol % of at least one monoethylenically unsaturated carboxylic acid, (c) from 1 to 90 mol % of at least one vinyl ester of saturated aliphatic monocarboxylic acids and/or vinyl alcohol, (d) from 0 to 20 mol % of other monoethylenically unsaturated monomers copolymerizable with said monomers (a) to (c) and (e) from 0 to 10 mol % of a crosslinker containing at least two ethylenically unsaturated double bonds, the mol % ages always adding up to 100.

Preferred multifunctional polymers contain polymerized units of (a) from 5 to 95 mol % of α-acyloxyacrylonitrile, α-haloacrylic acid, α-acyloxyacrylic ester and/or α-hydroxyacrylic acid, (b) from 2 to 90 mol % of at least one monoethylenically unsaturated carboxylic acid, (c) from 2 to 70 mol % of at least one vinyl ester of saturated aliphatic monocarboxylic acids and/or vinyl alcohol, and (d) from 0 to 15 mol % of other monoethylenically unsaturated monomers copolymerizable with said monomers (a) to (c), the mol % ages always adding up to 100.

Particular preference is given to those polymers as contain polymerized units of (a) from 10 to 90 mol % of α-acyloxyacrylonitrile, α-haloacrylic acid, α-acyloxyacrylic ester and/or α-hydroxyacrylic acid, (b) from 5 to 80 mol % of at least one monoethylenically unsaturated carboxylic acid, (c) from 5 to 60 mol % of at least one vinyl ester of saturated aliphatic monocarboxylic acids and/or vinyl alcohol, and (d) from 0 to 10 mol % of other monoethylenically unsaturated monomers copolymerizable with said monomers (a) to (c), the mol % ages always adding up to 100. These polymers usually contain copolymerized units of (a) from 5 to 95 mol % of α-hydroxyacrylic acid, (b) from 2 to 90 mol % of acrylic acid, methacrylic acid, maleic acid and/or maleic anhydride, and c) from 2 to 70 mol % of vinyl acetate and/or vinyl alcohol, the mol % ages always adding up to 100.

The multifunctional polymers are prepared by polymerizing the monomers (a) to (e) in the presence of polymerization initiators that form free radicals and subsequent partial or complete hydrolysis of the polymerized monomer units (a) and (c). Hydrolysis of the polymerized monomer units (a) creates α-hydroxyacrylic acid units. The polymerized α-acyloxyacrylonitrile units likewise give rise to α-hydroxyacrylic acid units in the form of their salts, for example under the action of aqueous bases to eliminate the α-acyl group and completely hydrolyze the nitrile group. The alkaline hydrolysis of polymers containing polymerized units of α-haloacrylic acid produces, through elimination of the halogen group, polymers containing α-hydroxyacrylic acid units. Polymers containing polymerized units of α-acyloxyacrylic esters are likewise hydrolyzed to polymers containing α-hydroxyacrylic acid units, by hydrolysis of the ester groups. Hydrolysis can be partial or complete. The copolymers are usually hydrolyzed to such an extent that water-soluble or at least water-dispersible copolymers are formed. The degree of hydrolysis is for example in the range from 10 to 100%, preferably from 50 to 100%.

The polymerization of the monomers (a) to (e) is carried out according to known processes in the manner of a solution, precipitation or emulsion polymerization. It can also be carried out as a bulk polymerization. The polymerization temperatures are for example in the temperature range of 50–150° C., preferably 60–130° C. The copolymerization can be carried out at atmospheric pressure, under reduced pressure or else under elevated pressure, for example at pressures of up to 20 bar. Useful solvents for a solution polymerization include for example hydrocarbons such as toluene and xylene, $C_1$–$C_6$-alcohols such as methanol, ethanol, isopropanol, n-propanol, isobutanol, n-butanol, tert-butanol, n-hexanol and cyclohexanol or ketones such as methyl ethyl ketone or acetone.

The emulsion polymerization is preferably carried out in water in the absence or presence (in amounts of up to 20% by weight, based on the reaction mixture) of surface-active substances. Preferred reaction media for the polymerization of the monomers are alcohols, aromatic hydrocarbons and water. The polymerization is initiated using customary initiators such as peroxides, for example perbenzoate, perpivalate and peroctoate, hydrogen peroxide, persulfates and azo compounds such as azobisisobutyronitrile or water-soluble azo compounds such as 2,2'-azobis(2-amidinopropane) dihydrochloride. The polymerization may be carried out in the presence of regulators, if desired. Useful regulators include all known regulating substances. Preferred regulators contain sulfur in bonded form such as dodecyl mercaptan, 2-mercaptoacetic acid, mercaptopropionic acid, 2-mercaptoethanol and mercaptobutanol. When a solvent or diluent is used in the polymerization, the solids content of the reaction mixture is for example in the range from 10 to 70%, preferably from 20 to 60%, by weight.

The copolymers are hydrolyzed following the polymerization. The hydrolysis can be carried out not only in the basic but also in the acidic pH range, except for polymers containing polymerized units of α-haloacrylic acid. However, polymers containing α-haloacrylic acid units can only be polymerized with bases. In most cases, one equivalent of a hydrolyzable group requires one equivalent of a base or acid. However, the bases or acids can be used up to an excess of 1.5, preferably up to 1.2, equivalents per hydrolyzable group. A base can be added all at once or continuously. It is also possible to initially charge a base and to add the polymer which is to be hydrolyzed to it all at once or continuously or batchwise. Useful bases for the hydrolysis are in particular alkali metal hydroxides such as sodium hydroxide or potassium hydroxide, ammonia or amines.

When the hydrolysis is carried out using an acid, catalytic amounts will be sufficient, for example from 0.01 to 0.1 equivalent of an acid per equivalent of the group to be hydrolyzed. The hydrolysis can be carried out at for example from 20 to 220° C., preferably at from 50 to 150° C. The hydrolysis is carried out in pressure tightly sealed apparatus at temperatures above the boiling point of water. If the polymerization has been carried out in an organic solvent, some or all of the organic solvent can be distilled off during the hydrolysis. Similarly, the alcohols released from α-acyloxyacrylic ester units during the hydrolysis can be distilled out of the reaction mixture, for example.

The hydrolysis of the polymerized units of vinyl esters of saturated monocarboxylic acids to form vinyl alcohol units is preferably carried out using alkali metal hydroxides. The copolymers preferably contain polymerized units of vinyl acetate as monomer c). The hydrolysis of the polymerized units c) is effected either partially, for example to an extent from 10 to 99%, or completely. The hydrolyzed copolymers usually still contain from 50 to 0.1% of unhydrolyzed vinyl ester units.

Usually monomer mixtures of
a) from 2 to 98 mol % of α-acyloxyacrylonitrile, α-haloacrylic acid and/or α-acyloxyacrylic ester,
b) from 1 to 95 mol % of monoethylenically unsaturated carboxylic acids,
c) from 1 to 90 mol % of at least one vinyl ester of an aliphatic monocarboxylic acid,
d) from 0 to 20 mol % of other monoethylenically unsaturated monomers copolymerizable with said monomers (a) to (c) and
e) from 0 to 10 mol % of a crosslinker containing at least two ethylenically unsaturated double bonds,
the percentages (a) to (e) always adding up to 100, are copolymerized and the units (a) and (c) in the copolymers thus obtainable are partially or completely hydrolyzed.

Particular preference is given to a process variant wherein
(a) from 5 to 95 mol % α-acyloxyacrylonitrile, α-chloroacrylic acid and/or α-acetoxyacrylic ester,
(b) from 2 to 90 mol % of acrylic acid, methacrylic acid, maleic acid and/or maleic anhydride and
(c) from 2 to 70 mol % of vinyl acetate
are copolymerized, the mol % ages always adding up to 100, and the polymerized units (a) and (c) in the copolymers are partially or completely hydrolyzed.

The above-described multifunctional polymers are used in laundry detergents and cleaners, to bind polyvalent metal ions, as a stabilizer in textile bleaching and the bleaching of fiber pulps for papermaking. When used in laundry detergents, the polymers provide not only an incrustation inhibition but also an augmentation of the primary detergency and at the same time stabilize the bleaches such as perborates or percarbonates.

The copolymers are used for example in amounts from 1 to 20%, preferably from 2 to 10%, by weight in laundry detergents and cleaners, in each case based on the entire formulation. The amounts of multifunctional polymer used in textile bleaching and the bleaching of paper stock range for example from 1 to 20% by weight, based on the aqueous bleach mix.

The copolymers of the invention are also excellent complexing agents for polyvalent metal ions such as calcium, iron, manganese and copper ions.

The K values of the polymers were determined after H. Fikentscher Cellulose-Chemie, volume 13, 58–64 and 71–74 (1932). The K value determination for the unhydrolyzed copolymers was carried out in acetone at 25° C. and a polymer concentration of 1% by weight. The K value of the hydrolyzed copolymers—provided the copolymers were completely soluble in water—was carried out in water at 25° C. and a polymer concentration of 1% by weight.

Unless otherwise stated (as in the case of comparative example 2), the hydrolysis was carried out in each case using 100% of the amount of base theoretically required to completely hydrolyze and neutralize all COOH groups.

INVENTIVE EXAMPLE 1

Terpolymer prepared from 82 mol % of ethyl α-acetoxyacrylate, 10 mol % of acrylic acid and 8 mol % of vinyl acetate.

In a 250 ml multi-neck glass flask equipped with a paddle stirrer, a reflux condenser, an internal thermometer and two dropping funnels, an initial charge of 25 g of isopropanol was heated to 85° C. in an oil bath under a nitrogen atmosphere. On reaching 85° C. metering was started of a 3 hour addition of a mixture of 72 g (0.4557 mol) of ethyl α-acetoxyacrylate, 4 g (0.0556 mol) of acrylic acid and 4 g (0.00465 mol) of vinyl acetate and concurrently a 6 hour addition of a mixture of 3.2 g of tert-butyl peroxide and 20 g of isopropanol. The copolymerization was carried out at 85° C. On completion of the initiator addition the reaction mixture was postpolymerized at 85° C. for 1.5 hours and then diluted with 80 g of isopropanol. The solution solidified on cooling. The solids content of the solution was 37.6%. The copolymer had a K value of 19.1 (determined in acetone at 25° C. and a polymer concentration of 1% by weight).

Hydrolysis:

In a 1 liter capacity stirred pot equipped with a reflux condenser, a distillation apparatus, an internal thermometer and an anchor stirrer, an initial charge of 172 g of the above-described polymer solution was heated in an oil bath at an oil bath temperature of 110° C. 134 g of a 25% by weight aqueous sodium hydroxide solution (0.8375 mol of NaOH) were added and at the same time isopropanol was distilled off until the internal temperature (temperature of the reaction mixture) had risen to 100° C. The thickening mass was diluted with 100 g of water and maintained at 100° C. for a further two hours. During this time a total of 400 g of water were added. The remaining isopropanol was removed from the reaction mixture under a reduced pressure of about 700 mbar to leave a clear orange solution having a solids content of 13.9%. The copolymer had a K value of 20.5 (determined in 1% aqueous solution at 25° C.).

INVENTIVE EXAMPLE 2

Terpolymer prepared from 67 mol % of ethyl α-acetoxyacrylate, 18 mol % of acrylic acid and 15 mol % of vinyl acetate.

The apparatus described in inventive example 1 was initially charged with 25 g of isopropanol. The monomer feed was composed of 64 g (0.4051 mol) of ethyl α-acetoxyacrylate, 8 g (0.1111 mol) of acrylic acid and 8 g (0.0930 mol) of vinyl acetate. The initiator feed was as in inventive example 1 a solution of 3.2 g of tert-butyl peroxide in 20 g of isopropanol. The monomer feed stream was metered into the initial charge in the course of three hours and the initiator in the course of 6 hours. The coolymerization took place at 85° C. The postpolymerization time was two hours. The reaction mixture was then diluted with 138 g of isopropanol to obtain a liquid which was very cloudy at room temperature and had a solids content of 28.6%. The K value of the copolymer was 19.8 (measured in 1% solution in acetone at 25° C.).

Hydrolysis 238 g of the above-described reaction mixture was hydrolyzed as described in inventive example 1 by adding 145 g of a 25% by weight aqueous sodium hydroxide solution (0.9063 mol of NaOH) and distilling off isopropanol at the same time. Hydrolysis for about 30 minutes yielded a viscous yellow mass which was diluted with 100 g of water to form a coarse suspension. After the temperature of the reaction mixture had risen to 100° C., the reaction mixture was stirred at that temperature for two hours and admixed with 200 g of water. The isopropanol remaining in the reaction mixture was distilled out of the mixture at a pressure of about 700 mbar. The result was a light red, cloudy solution having a solids content of 23.2%. The copolymer had a K value of 22.4 (determined in aqueous solution and at a concentration of 1% by weight and 25° C.).

INVENTIVE EXAMPLE 3

Terpolymer prepared from 54 mol % of ethyl α-acetoxyacrylate, 17 mol % of acrylic acid and 29 mol % of vinyl acetate.

The copolymerization was carried out similarly to the directions in inventive example 1, except that the monomer feed was composed of 56 g (0.3544 mol) of ethyl α-acetoxyacrylate, 8 g (0.1111 mol) of acrylic acid and 16 g (0.1860 mol) of vinyl acetate. The postpolymerization time was 2 hours. 80 g of isopropanol were added as diluent to form a clear colorless polymer solution having a solids content of 36.2%. The copolymer had a K value of 19.1 (measured in acetone at 25° C. and a polymer concentration of 1% by weight).
Hydrolysis 178 g of the above-described polymer solution were initially charged to a 1 liter stirred pot equipped with reflux condenser, distillation apparatus, internal thermometer and anchor stirrer and heated in an oil bath having a temperature of 100° C. As soon as the internal temperature was 50° C., 137.6 g of 25% by weight aqueous sodium hydroxide solution (0.86 mol of NaOH) were added over 15 minutes and isopropanol was distilled off to leave a yellow suspension which was diluted with 300 g of water. The remaining isopropanol was removed from the mixture at 700 mbar and 85° C. to leave a clear yellowish orange polymer solution having a solids content of 22.1%. The copolymer had a K value of 22.4 (determined in 1% aqueous solution at 25° C.).

INVENTIVE EXAMPLE 4

Terpolymer prepared from 54 mol % of ethyl α-acetoxyacrylate, 17 mol % of acrylic acid and 29 mol % of vinyl acetate.

The polymerization described in inventive example 3 was repeated with the exceptions that the initiator used was a mixture of 7.2 g of tert-butyl perpivalate in the form of a 75% by weight solution in aliphatics and 17 g of isopropanol and the monomer stream was metered in over five hours and the initiator over six hours. A two hour postpolymerization time and dilution of the batch with 80 g of isopropanol afforded a clear colorless polymer solution having a solids content of 35.5%. The polymer had a K value of 13.4 (measured in 1% solution in acetone at 25° C.).
Hydrolysis 116 g of the above-described polymer solution were heated to an internal temperature of 110° C. by means of an oil bath. As soon as the temperature had reached 50° C., 125.2 g of a 25% by weight aqueous solution of potassium hydroxide (0.5579 mol of KOH) were gradually added. The reaction mixture was then maintained at 110° C. for two hours. Isopropanol was then distilled off at 700 mbar and 85° C. to leave a clear yellowish orange polymer solution having a solids content of 27.3%. The K value of the polymer was 13.3 (determined in aqueous solution at 25° C. and a polymer concentration of 1%).

INVENTIVE EXAMPLE 5

Terpolymer prepared from 53 mol % of ethyl α-acetoxyacrylate, 33 mol % of acrylic acid and 14 mol % of vinyl acetate.

The polymerization was carried out similarly to inventive example 1 except that the monomer feed used was 56 g (0.3544 mol) of ethyl α-acetoxyacrylate, 16 g (0.2222 mol) of acrylic acid and 8 g (0.0930 mol) of vinyl acetate and the initiator feed was 3.2 g of tert-butyl peroxide in 55 g of isopropanol. The postpolymerization time was two hours. In departure from the method of example 1, 45 g of isopropanol were added to obtain a clear yellow polymer solution having a solids content of 37.9%. The K value of the copolymer was 19.0 (determined in 1% solution in acetone at 25° C.).
Hydrolysis 180 g of the above-described polymer solution were heated up in the apparatus described in inventive example 1, in an oil bath heated to 110° C., and hydrolyzed according to the method indicated in inventive example 1 by addition of 142 g of 25% by weight aqueous sodium hydroxide solution (0.8875 mol of NaOH). Isopropanol was distilled off at the same time. After about 15 minutes this afforded a yellow suspension which was diluted to a clear solution with 200 g of water. The remaining isopropanol was removed from the mixture at 85° C. under a pressure of about 700 mbar to leave a clear dark yellow polymer solution having a solids content of 27.5%. The copolymer had a K value of 27.4 (determined in 1% aqueous solution at 25° C.).

INVENTIVE EXAMPLE 6

Terpolymer prepared from 44 mol % of ethyl α-acetoxyacrylate, 16 mol % of acrylic acid and 40 mol % of vinyl acetate.

The polymerization described in inventive example 1 was repeated except that the monomer feed used was 48 g (0.3038 mol) of ethyl α-acetoxyacrylate, 8 g (0.1111 mol) of acrylic acid and 24 g (0.2791 mol) of vinyl acetate and the reaction mixture was postpolymerized for two hours to afford a clear yellow polymer solution having a solids content of 35.0%. The copolymer had a K value of 29.7 (determined in 1% solution in acetone at 25° C.).
Hydrolysis 157 g of the above-described copolymer solution in isopropanol were heated in a 1 liter capacity stirred pot equipped with reflux condenser, distillation apparatus, internal thermometer and anchor stirrer to an internal temperature of 80° C. As soon as the temperature had reached 50° C., 120 g of 25% by weight aqueous sodium hydroxide solution (0.75 mol of NaOH) and 200 g of water were slowly added concurrently and the batch was then diluted with 300 g of water. Isopropanol was distilled off during the hydrolysis. The remaining isopropanol was removed from the reaction mixture at 85° C. under a pressure of about 700 mbar to leave a clear dark red solution having a solids content of 13.0%. The copolymer had a K value of 26.7 (determined in 1% aqueous solution at 25° C.).

INVENTIVE EXAMPLE 7

Terpolymer prepared from 34 mol % of ethyl α-acetoxyacrylate, 15 mol % of acrylic acid and 51 mol % of vinyl acetate.

Inventive example 1 was repeated with the exceptions that a monomer mixture of 40 g (0.2532 mol) of ethyl α-acetoxyacrylate, 8 g (0.1111 mol) of acrylic acid and 32 g (0.373 mol) of vinyl acetate were used and the reaction mixture was postpolymerized for two hours to afford a clear yellow polymer solution having a solids content of 34.3%. The K value of the copolymer was 28.0 (determined in 1% solution in acetone at 25° C.).

Hydrolysis 166 g of the above-described polymer solution in isopropanol were initially charged to the hydrolysis apparatus described in inventive example 1 and heated to an internal temperature of 80° C.

As soon as the temperature had reached 50° C., 126.2 g of 25% by weight aqueous sodium hydroxide solution (0.7888 mol of NaOH) and separately 200 g of water were gradually added concurrently and the batch was then diluted with 300 g of water. Isopropanol was distilled off during the hydrolysis. The remaining isopropanol was removed at 85° C. under a pressure of 700 mbar to leave a slightly cloudy, reddish brown solution having a solids content of 14.2%. The K value of the copolymer was 24.9 (determined in 1% aqueous solution at 25° C.).

COMPARATIVE EXAMPLE 1

Copolymer prepared from 31 mol % of ethyl α-acetoxyacrylate and 69 mol % of acrylic acid.

In a 250 ml capacity multi-neck glass flask equipped with a reflux condenser, two dropping funnels and an internal thermometer, an initial charge of 20 g of isopropanol was heated to an internal temperature of 85° C. by means of an oil bath under nitrogen atmosphere. A monomer stream comprising a mixture of 39.5 g (0.25 mol) of ethyl α-acetoxyacrylate, 39.5 g (0.5486 mol) of acrylic acid and 50 g of isopropanol and an initiator stream comprising a mixture of 13.2 g of 30% by weight hydrogen peroxide and 25 g of water were then added concurrently, the monomer stream being metered into the reaction vessel in the course of three hours and the initiator stream in the course of six hours. On completion of the initiator addition the reaction mixture was postpolymerized for an hour to form a clear, highly viscous, light yellow mass which was diluted with 60 g of isopropanol and 30 g of water to form an almost colorless clear viscous solution. The solids content of the solution was 52.0%. The copolymer had a K value of 25.4 (determined in 1% solution in acetone at 25° C.).

Hydrolysis

The above-obtained reaction mixture was hydrolyzed in the hydrolysis vessel described in the inventive example 1 at an internal temperature of 80° C. by addition of 176 g of 25% by weight aqueous sodium hydroxide solution (1.1 mol of NaOH). The sodium hydroxide solution was added dropwise in the course of 15 minutes. At the same time isopropanol was distilled off until the internal temperature had risen to 100° C. The mixture was subsequently maintained at 100° C. for one hour. It was then diluted with water until the light yellow viscous solution had become clear. This required about 150 g of water. The solution had a solids content of 44.5 g. The copolymer had a K value of 34.0 (determined in 1% aqueous solution at 25° C.).

COMPARATIVE EXAMPLE 2

Homopolymer prepared from ethyl α-acetoxyacrylate.

In a 250 ml capacity multi-neck glass flask equipped with a paddle stirrer, a reflux condenser, two dropping funnels and an internal thermometer, an initial charge of 80 g of isopropanol and 120 g (0.7595 mol) of ethyl α-acetoxyacrylate was heated to 85° C. by means of an oil bath under a nitrogen atmosphere. A mixture of 20 g of 30% by weight hydrogen peroxide and 20 g of water was metered in over five hours. On completion of the addition of the initiator the reaction mixture was postpolymerized for 1.5 hours and diluted with 80 g of isopropanol and 40 g of water to leave a light yellow, slightly cloudy, viscous solution of a homopolymer of ethyl α-acetoxyacrylate having a solids content of 26.5%. The polymer had a K value of 27.5 (determined in 1% solution in acetone at 25° C.).

Hydrolysis 170 g of the above-described solution of the homopolymer were initially charged to the hydrolysis apparatus described in inventive example 1, heated to an internal temperature of 70° C. and admixed with 176.7 g of 25% by weight aqueous potassium hydroxide solution (0.7874 mol of KOH =110% of the amount of base theoretically required for complete saponification). At the same time isopropanol was distilled off until the internal temperature had risen to 100° C. The mixture was then stirred at 100° C. for two hours and diluted with a little water to form a clear reddish brown solution. The solids content of the polymer solution was 28.6%. The thus obtained homopolymer of α-hydroxyacrylic acid had a K value of 19.7 (determined in 1% aqueous solution at 25° C.).

COMPARATIVE EXAMPLE 3

Copolymer prepared from 35 mol % of ethyl α-acetoxyacrylate and 65 mol % of vinyl acetate.

In a 250 ml capacity multi-neck glass flask equipped with a reflux condenser, two dropping funnels and an internal thermometer an initial charge of 25 g of toluene was heated to 75° C. by means of an oil bath under a nitrogen atmosphere. As soon as 75° C. was reached, a monomer stream comprising a mixture of 40 g (0.2532 mol) of ethyl α-acetoxyacrylate and 40 g (0.4651 mol) of vinyl acetate and an initiator stream comprising a mixture of 8.5 g of tert-butyl perpivalate (75% by weight in aliphatics) and 18 g of toluene were added concurrently, the monomers being metered in over five hours and the initiator over six hours. On completion of the addition of the initiator the mixture was postpolymerized at 75° C. for two hours and diluted with 80 g of acetone to leave a clear colorless polymer solution having a solids content of 36.6%. The K value of the copolymer was 11.2 (determined in 1% solution in acetone at 25° C.).

Hydrolysis 135 g of the above-described polymer solution in the hydrolysis apparatus described in inventive example 1 were admixed with 69.5 g of 50% by weight aqueous sodium hydroxide solution (0.6194 mol of KOH) and stirred at 60° C. for 4 hours. The reaction mixture was then heated to an internal temperature of 100° C., the solvent was gradually distilled off, and the batch was diluted with a total of 400 g of water added a little at a time to afford a clear dark red solution of a copolymer. The solids content of the solution was 16.5%. The copolymer had a K value of 11.0 (determined in 1% aqueous solution at 25° C.).

The polymers prepared in the inventive and comparative examples were tested for bleach stabilization, dispersing power and ash reduction performance according to the following methods:

Bleach Stabilization

The test was carried out in a phosphate-free laundry detergent formulation of the following composition (in % by weight):

16.7% of sodium $C_{12}$-alkylbenzenesulfonate (50% by weight aqueous solution)

6.7% of addition product of 11 mol of ethylene oxide with 1 mol of tallow fatty alcohol 16.7% of sodium perborate·4 H$_2$O 33.3% of zeolite A 2.92% of copolymer of acrylic acid and maleic acid in weight ratio of 50:50 (MW=50000)

22.68% of sodium sulfate

1% of the tetrasodium salt of 2,6-bis(N,N-(diacetic acid) aminomethyl)-4-isododecylphenol or tetrasodium ethylenediaminetetraacetate (EDTA) as comparative compound Laundry detergent concentration was 6.2 g/l using 25° German hardness water. Decomposition was initiated by adding 5 ppm of Cu$^{2+}$ to the hot detergent liquor at 60° C. The residual peroxide content after 1 h at 60° C. is reported in the table as bleach stabilization.

Determination of Calcium Binding Power (CBP)

Principle of Measurement

The inhibiting effect of complexing agents or dispersants on the precipitation of calcium carbonate is determined by turbidity titration. The in-test substance is initially charged and titrated with calcium acetate solution in the presence of sodium carbonate. The end point is indicated through formation of the calcium carbonate precipitate. Use of a sufficient amount of sodium carbonate ensures that the measurement will provide a correct result even when the effect is due not just to calcium ions being complexed but to calcium carbonate being dispersed. This is because if insufficient sodium carbonate is used there is a danger that the dispersing power of the product is not exhausted. In this case the titration end point is determined by the precipitation of the calcium salt of the in-test compound.

During the titration, the change in the light transmittance is monitored by means of an optical fiber photometer. In the latter, a light beam passed through a glass fiber into the solution is reflected at a mirror and the intensity of the reflecting light is measured.

Reagents 0.25 M Ca(OAc)$_2$ solution

10% by weight of Na$_2$CO$_3$ solution

1 N NaOH solution

1% by weight hydrochloric acid

Procedure 1 g of active substance (A.S.) in the form of the trisodium salt is dissolved in 100 ml of distilled H$_2$O. 10 ml of 10% by weight Na$_2$CO$_3$ solution are then added. The solution is automatically titrated continuously with 0.25 M Ca(OAc)$_2$ solution at 0.2 ml/min at room temperature (RT) and a pH of 11 (kept constant during the titration) and at 80° C. and a pH of 10.

Calculation

Amount mg of CaCO$_3$/g of A.S.=consumption of Ca(OAc)$_2$ solution in ml×25. The end point is the 1st point of deflection of the automatic titration curve.

Ash Reduction

The incrustation-inhibiting effect (ash reduction) of the polymers was tested in each case in the following laundry detergent formulation as additive:

| Laundry detergent formulation | Parts by weight |
|---|---|
| Linear dodecylbenzenesulfonate | 6 |
| C$_{12}$C$_{18}$-alkyl sulfate | 2 |
| C$_{13}$C$_{15}$ oxo alcohol with 7 EO | 7 |
| Soap | 1 |
| Na metasilicate × 5.5 H$_2$O | 3.5 |
| Zeolite A | 36 |
| Na carbonate | 12 |

| Laundry detergent formulation | Parts by weight |
|---|---|
| Tetraacetylethylenediamine (TAED) | 3.5 |
| Na perborate monohydrate | 15 |
| Carboxymethylcellulose (CMC) | 1.5 |
| Na sulfate | 3 |
| Water | 4.5 |
| Additive | 5 |

The above-described laundry detergent formulation contained 5% by weight of the copolymers to be tested for incrustation inhibition. The thus prepared laundry detergent formulations were used to wash test cloths made of cotton. After washing, the ash content of the cloths was determined by ashing 5 g of the test cloth at 700° C. for 2 hours.

The effect (W) of the laundry detergent additive in the A formulation is reported in percent effectiveness, where 0% effect corresponds to the ash content without incrustation inhibitor, i.e. without laundry detergent additive (A without) and 100% effect corresponds to the ash content of the cloth before washing (A null).

The effect W of the additive is calculated from the determined ash content (A additive) by the following equation:

$$W = \left(1 - \frac{(A\text{-Additive}) - (A\text{-null})}{(A\text{-without}) - (A\text{-null})}\right) \times 100 \, [\%]$$

The following washing conditions were used:

| | |
|---|---|
| Apparatus: | Launder-O-meter from Atlas |
| Number of wash cycles: | 15 |
| Wash liquor: | 250 g |
| Water hardness: | 4 mmol per liter (Ca:Mg = 4:1) |
| Washing time: | 30 min at 60° C. (including heating time) |
| Liquor ratio: | 12.5:1 |
| Test cloth: | Cotton cheese cloth |
| Detergent concentration: | 4.5 g/l |
| Ash null value: | 0.04% by weight |
| EMPA 211 | 0.09% by weight (Swiss materials testing institute at St. Gallen, Switzerland) |

The ash reduction test gave the following results:

TABLE

| Example No. | Bleach stabilization (Cu) [%] | CBP [mg of CaCO$_3$/g of polymer] | Ash reduction [%] |
|---|---|---|---|
| Inv. 1 | 87.7 | 670 | 30.26 |
| Inv. 2 | 91.4 | 685 | 27.35 |
| Inv. 3 | 89.4 | 635 | 18.72 |
| Inv. 4 | 77.7 | 500 | 44.16 |
| Inv. 5 | 85.6 | 660 | 38.31 |
| Inv. 6 | 85.6 | 580 | 28.66 |
| Inv. 7 | 89.9 | 500 | 44.2 |
| Comp. 2 | 92.2 | 250 | −21.5 |
| Comp. 1 | 77.3 | 220 | −4.9 |
| Comp. 3 | 66.6 | 165 | 19.3 |
| Blank value (no added polymer) | 10 | 0 | 0. |

We claim:

1. A multifunctional polymer comprising polymerized units of (a) an α-acyloxyacrylonitrile, αhaloacrylic acid, αacyloxyacrylic ester, α-hydroxyacrylic acid or a mixture thereof, (b) one or more monoethylenically unsaturated carboxylic acids, (c) one or more vinyl esters of saturated aliphatic monocarboxylic acids, vinyl alcohol or a mixture thereof, (d) optionally, one or more other monoethylenically unsaturated monomers copolymerizable with said monomers (a) to (c), and (e) optionally, one or more crosslinkers comprising at least two ethylenically unsaturated double bonds, wherein the multifunctional polymer has a K value of at least 7 and optionally wherein the monomer units (a) and (c) are partially or completely hydrolyzed.

2. The multifunctional polymer as claimed in claim 1, comprising polymerized units of (a) from 2 to 98 mole % of an α-acyloxyacrylonitrile, α-haloacrylic acid, α-acyloxyacrylic ester, α-hydroxyacrylic acid or a mixture thereof, (b) from 1 to 95 mol % of at least one monoethylenically unsaturated carboxylic acid, (c) from 1 to 90 mol % of at least one vinyl ester of saturated aliphatic monocarboxylic acids, vinyl alcohol or a mixture thereof, (d) from 0 to 20 mol % of one or more other monoethylenically unsaturated monomers copolymerizable with said monomers (a) to (c), and (e) from 0 to 10 mol % of a crosslinker comprising at least two ethylenically unsaturated double bonds, wherein the total mol % is 100.

3. The multifunctional polymer as claimed in claim 1, comprising polymerized units of (a) from 5 to 95 mol % of an α-acyloxyacrylonitrile, α-haloacrylic acid, α-acyloxyacrylic ester, α-hydroxyacrylic acid or a mixture thereof, (b) from 2 to 90 mol % of at least one monoethylenically unsaturated carboxylic acid, (c) from 2 to 70 mol % of at least one vinyl ester of saturated aliphatic monocarboxylic acids, vinyl alcohol or a mixture thereof, and (d) from 0 to 15 mol % of one or more other monoethylenically unsaturated monomers copolymerizable with said monomers (a) to (c), wherein the total mol % is 100.

4. The multifunctional polymer as claimed in claim 1, comprising polymerized units of (a) from 10 to 90 mol % of an α-acyloxyacrylonitrile, α-haloacrylic acid, z-acyloxyacrylic ester, α-hydroxyacrylic acid or a mixture thereof, (b) from 5 to 80 mol % of at least one monoethylenically unsaturated carboxylic acid, (c) from 5 to 60 mol % of at least one vinyl ester of saturated aliphatic monocarboxylic acids, vinyl alcohol or a mixture thereof, and (d) from 0 to 10 mol % of one or more other monoethylenically unsaturated monomers copolymerizable with said monomers (a) to (c), wherein the total mol % is 100.

5. The multifunctional polymer as claimed in claim 1, comprising polymerized units of (a) from 5 to 95 mol % of α-hydroxyacrylic acid, (b) from 2 to 90 mol % of acrylic acid, methacrylic acid, maleic acid, maleic anhydride or a mixture thereof, and (c) from 2 to 70 mol % of vinyl acetate, vinyl alcohol or a mixture thereof, wherein the total mol % is 100.

6. A multifunctional polymer comprising polymerized units of (a) α-hydroxyacrylic acid, (b) one or more monoethylenically unsaturated carboxylic acids, (c) one or more partially or completely hydrolyzed vinyl esters of saturated aliphatic monocarboxylic acids, (d) optionally, one or more other monoethylenically unsaturated monomers copolymerizable with said monomers (a) to (c), and (e) optionally, one or more crosslinkers comprising at least two ethylenically unsaturated double bonds, wherein the multifunctional polymer has a K value of at least 6.

7. A process for preparing the multifunctional polymer as claimed in claim 1, which comprises copolymerizing a monomer mixture comprising (a) an α-acyloxyacrylonitrile, α-haloacrylic acid, α-acyloxyacrylic ester or a mixture thereof, (b) one or more monoethylenically unsaturated carboxylic acids, (c) one or more vinyl esters of saturated aliphatic monocarboxylic acids, (d) optionally, one or more other monoethylenically unsaturated monomers copolymerizable with said monomers (a) to (c), and (e) optionally, one or more crosslinkers comprising at least two ethylenically unsaturated double bonds, wherein the monomer mixture is copolymerized in the presence of one or more polymerization initiators that form free radicals, to form the multifunctional polymer and optionally, further comprising partially or completely hydrolyzing the polymerized monomer units (a) and (c) in the multifunctional polymer.

8. The process as claimed in claim 7, wherein the monomer mixture comprises (a) from 2 to 98 mol % of an α-acyloxyacrylonitrile, α-haloacrylic acid, α-acyloxyacrylic ester or a mixture thereof, (b) from 1 to 95 mol % of one or more monoethylenically unsaturated carboxylic acids, (c) from 1 to 90 mol % of at least one vinyl ester of an aliphatic monocarboxylic acid, (d) from 0 to 20 mol % of one or more other monoethylenically unsaturated monomers copolymerizable with said monomers (a) to (c), and (e) from 0 to 10 mol % of a crosslinker comprising at least two ethylenically unsaturated double bonds, wherein the total mol % of (a) to (e) is 100, and the copolymerized monomer units (a) and (c) are partially or completely hydrolyzed.

9. The process as claimed in claim 7, wherein the monomer mixture comprises (a) from 5 to 95 mol % of an α-acyloxyacrylonitrile, α-chloroacrylic acid, α-acetoxyacrylic ester or a mixture thereof, (b) from 2 to 90 mol % of acrylic acid, methacrylic acid, maleic acid, maleic anhydride or a mixture thereof, and (c) from 2 to 70 mol % of vinyl acetate, wherein the total mol % is 100, and the polymerized units (a) and (c) in the multifunctional polymer are partially or completely hydrolyzed.

10. A process for preparing the multifunctional polymer claimed in claim 6, which comprises copolymerizing a monomer mixture comprising (a) an α-acyloxyacrylonitrile, α-haloacrylic acid, α-acyloxyacrylic ester or a mixture thereof, (b) one or more monoethylenically unsaturated carboxylic acids, (c) one or more vinyl esters of saturated aliphatic monocarboxylic acids, (d) optionally, one or more other monoethylenically unsaturated monomers copolymerizable with said monomers (a) to (c), and (e) optionally, one or more crosslinkers comprising at least two ethylenically unsaturated double bonds, wherein the monomer mixture is copolymerized in the presence of one or more polymerization initiators that form free radicals, to form the multifunctional polymer and further comprising completely hydrolyzing monomer units (a) and partially or completely hydrolyzing the polymerized monomer units (c) in the multifunctional polymer.

11. The process as claimed in claim 10, wherein the monomer mixture comprises (a) from 2 to 98 mol % of an α-acyloxyacrylonitrile, α-haloacrylic acid, α-acyloxyacrylic ester or a mixture thereof, (b) from 1 to 95 mol % of one or more monoethylenically unsaturated carboxylic acids, (c) from 1 to 90 mol % of at least one vinyl ester of an aliphatic monocarboxylic acid, (d) from 0 to 20 mol % of one or more other monoethylenically unsaturated monomers copolymerizable with said monomers (a) to (c), and (e) from 0 to 10 mol % of a crosslinker comprising at least two ethylenically unsaturated double bonds, wherein the total mol % of (a) to (e) is 100, and the copolymerized monomer units (a) are completely hydrolyzed and monomer units (c) are partially or completely hydrolyzed.

12. The process as claimed in claim 10, wherein (a) from 5 to 95 mol % of an α-acyloxyacrylonitrile, α-chloroacrylic acid, α-acetoxyacrylic ester or a mixture thereof, (b) from 2 to 90 mol % of acrylic acid, methacrylic acid, maleic acid, maleic anhydride or a mixture thereof, and (c) from 2 to 70 mol % of vinyl acetate, wherein the total mol % is 100, and the polymerized monomer units (a) in the multifunctional polymer are completely hydrolyzed and monomer units (c) are partially or completely hydrolyzed.

13. A process, comprising:

mixing the multifunctional polymer claimed in claim 1 with one or more components to form a laundry detergent or cleaner.

14. A process, comprising:

mixing the multifunctional polymer claimed in claim 6 with one or more components to form a laundry detergent or cleaner.

15. A process, comprising:

binding a polyvalent metal ion by contacting the multifunctional polymer claimed in claim 1 with the polyvalent metal ion.

16. A process, comprising:

binding a polyvalent metal ion by contacting the multifunctional polymer claimed in claim 6 with the polyvalent metal ion.

17. A process, comprising:

stabilizing a textile bleach or a bleach for papermaking by contacting the multifunctional polymer claimed in claim 1 with the bleach.

18. A process, comprising:

stabilizing a textile bleach or a bleach for papermaking by contacting the multifunctional polymer claimed in claim 6 with the bleach.

19. A composition comprising the multifunctional polymer claimed in claim 1 in an amount ranging from 1 to 20% by weight.

20. A composition comprising the multifunctional polymer claimed in claim 6 in an amount ranging from 1 to 20% by weight.

* * * * *